United States Patent

Okuhara et al.

[11] Patent Number: 5,651,686
[45] Date of Patent: Jul. 29, 1997

[54] ROTARY CONNECTOR DEVICE

[75] Inventors: Takeshi Okuhara; Ryoji Ebina; Takashi Sakamaki, all of Tokyo, Japan

[73] Assignee: Niles Parts Co., Ltd., Tokyo, Japan

[21] Appl. No.: 463,850

[22] Filed: Jun. 5, 1995

[30] Foreign Application Priority Data

Jul. 1, 1994 [JP] Japan .................. 6-173415
Sep. 7, 1994 [JP] Japan .................. 6-239506

[51] Int. Cl.[6] .................................................. H01R 39/02
[52] U.S. Cl. ......................................................... 439/164
[58] Field of Search ....................................... 439/164, 15

[56] References Cited

U.S. PATENT DOCUMENTS 5,226,830 7/1993 Ueno ........................... 439/164

FOREIGN PATENT DOCUMENTS 1170980 12/1989 Japan ................. H01R 35/04
4298982 10/1992 Japan ................. H01R 35/04

Primary Examiner—Neil Abrams
Assistant Examiner—T. C. Patel
Attorney, Agent, or Firm—Ronald P. Kananen; Jeffrey L. Thompson

[57] ABSTRACT

A rotary connector device in which a flexible cable is maintained in parallel with the wall of a housing even if the supporting member is deformed, thereby reducing noise from the flexible cable and deterioration of the durability of the cable. Projections, which are crushed upon assemblage, are provided for absorbing an assemblage tolerance. The flexible cable is received spirally within the space formed between a rotor housing and a stator housing. A terminal is electrically connected to conductive wires exposed from the flexible cable and formed with the supporting member in a body. The supporting member has a connector section and a cable connecting section supported by the connector section as a cantilever. The cable connecting section is connected to each of the housings, and the connector section is connected to the cable connecting section through a predetermined gap. Projections are also provided on an offset of the inner surface of the rotor housing for absorbing the assemblage tolerance in a circular direction and an axial direction simultaneously. These projections are crushed upon assembling the rotor housing with the attachment.

10 Claims, 7 Drawing Sheets

ROTARY CONNECTOR DEVICE

BACKGROUND OF THE INVENTION

1. Field of the Invention

The present invention relates to an improvement of a rotary connector device for suitably supplying an electric power, for example, to an air bag or the like mounted on a pad section of a steering wheel of automobiles, and particularly to a technique in an improvement of supporting member in which terminals to be electrically connected to a flexible cable are molded with the flexible cable in a body. Moreover, the present invention relates to a technique for removing a clearance generated due to an assemblage tolerance undesirably produced upon connecting a stator housing with a rotor housing by using an attachment.

2. Description of the Related Art

Hitherto, there was known several examples of rotary connector device having such structure that terminals used for connecting a flexible cable are supported on a supporting member. Japanese Patent Publication Laid-Open No. 4-298982, for example, shows such structure that terminals used for connecting a flexible cable are supported on a supporting member, and the supporting member is fetched outwardly through a through hole mounted on the wall of a housing.

Moreover, Japanese Utility Model Publication Laid-Open No. 1-170980 shows a rotary connector device in which a stator housing is connected to a rotor housing by using an attachment.

SUMMARY OF THE INVENTION

The supporting member of this type, however, is in general formed by resin molding, and therefore may be deformed due to distortion generated during molding process. By this deformation of the supporting member, there have been generated such problems that it is hardly maintained to keep the flexible cable connected to terminals in parallel with the wall of the housing receiving the flexible cable thereby making any interference between the flexible cable and the wall of the housing. Therefore, any noise has been undesirably generated from the flexible cable upon the rotation of the rotor housing, and durability of the flexible cable has been reduced.

The present invention is made to remove the above-mentioned problems involved in the conventional device, and the object of the present invention is to present a rotary connector device in which the deformation of a supporting member to be generated during a molding process can be reduced, and it can be kept to maintain the flexible cable in parallel with the wall of a housing even if the supporting member would be deformed, thereby effectively reducing such problems that there are produced any noise from the flexible cable and deterioration of the flexible cable in durability.

The present invention presents the following means in order to achieve the above-mentioned object of the present invention.

The present invention presents a rotary connector device comprising housings, a flexible cable received in the space formed between the housings, a terminal electrically connected to conductive wires exposed from the flexible cable, a supporting member fixed on the housings and molded with the terminal, characterized in that the supporting member is provided with a connector section, and a cable connecting section connected to the connector section as a cantilever.

The present invention presents a rotary connector device characterized in that the cable connecting section of the supporting member is fixed at least on the housing.

The present invention presents a rotary connector device characterized in that the connector section of the supporting member is coupled with the cable connecting section with a predetermined gap.

Moreover, according to the rotary connector device mentioned above, there is undesirably generated a clearance produced by tolerances of the stator housing, the rotor housing, and the attachment. Therefore, there is problems that when the rotor housing is rotated together with a steering wheel with respect to the stator housing, noise is undesirably generated due to the above-mentioned clearance thereby providing discomfort feeling to passengers of vehicle.

The present invention is made for solving the above-mentioned problems, and the object of the present invention is to present an improvement of a rotary connector device in which there is provided a projection to be crushed upon assemblage thereby preventing the generation of any clearance by absorbing assemblage tolerances.

The present invention presents the following means in order to achieve the above-mentioned object of the present invention.

The present invention presents a rotary connector device comprising a stator housing, a rotor housing rotatably mounted with respect to the stator housing, an attachment for coupling both housings, and a flexible cable spirally received within the space provided between the stator housing and the rotator housing, characterized in that a protections to be crushed when the stator housing, the rotor housing, and the attachment are assembled, are mounted on at least one of the stator housing, the rotor housing, and the attachment.

As an embodiment, the present invention presents a rotary connector device characterized in that the protection is mounted within a recess section.

As an other embodiment, the present invention presents a rotary connector device characterized in that an offset to be contacted to the attachment is formed on at least one of the stator housing and the rotor housing.

As an other embodiment, the present invention presents a rotary connector device characterized in that the offset provides a first surface formed with a first protection in the circular direction of the housing, and a second surface formed with a second projection in the axial direction of the housing respectively.

DETAILED DESCRIPTION OF THE PREFERRED EMBODIMENT

Figure 1:
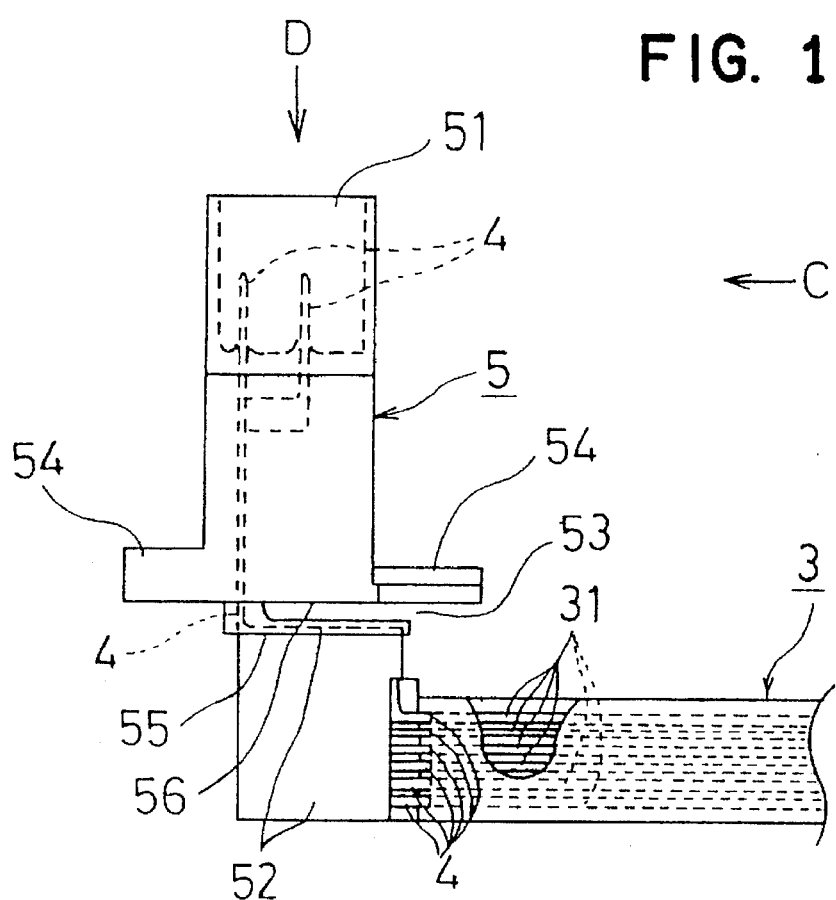
FIG. 1 is a front view showing a supporting member as a preferred embodiment of the present invention.
Figure 2:
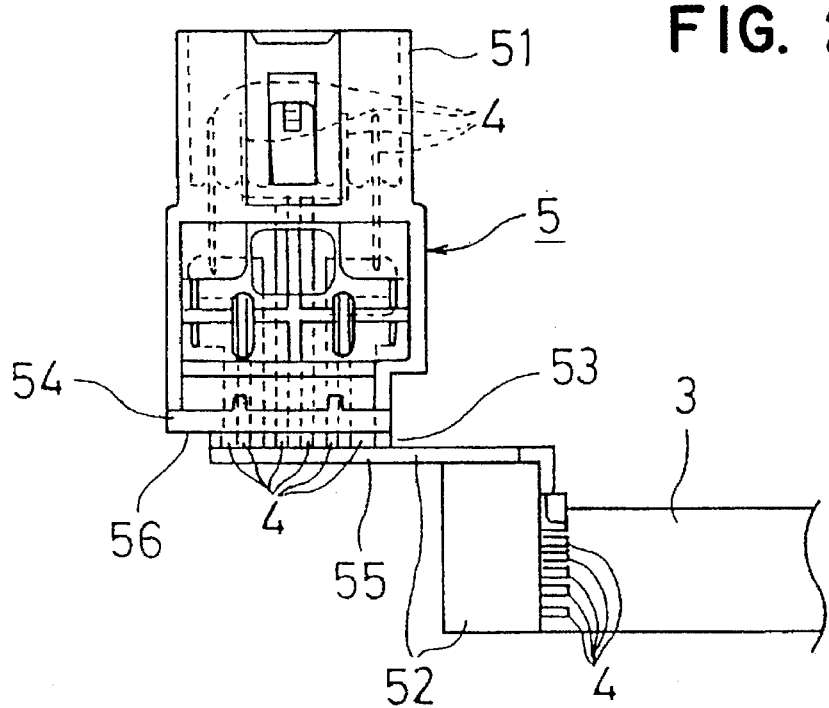
FIG. 2 is a side sectional view taken in the direction C in FIG. 1.
Figure 3:
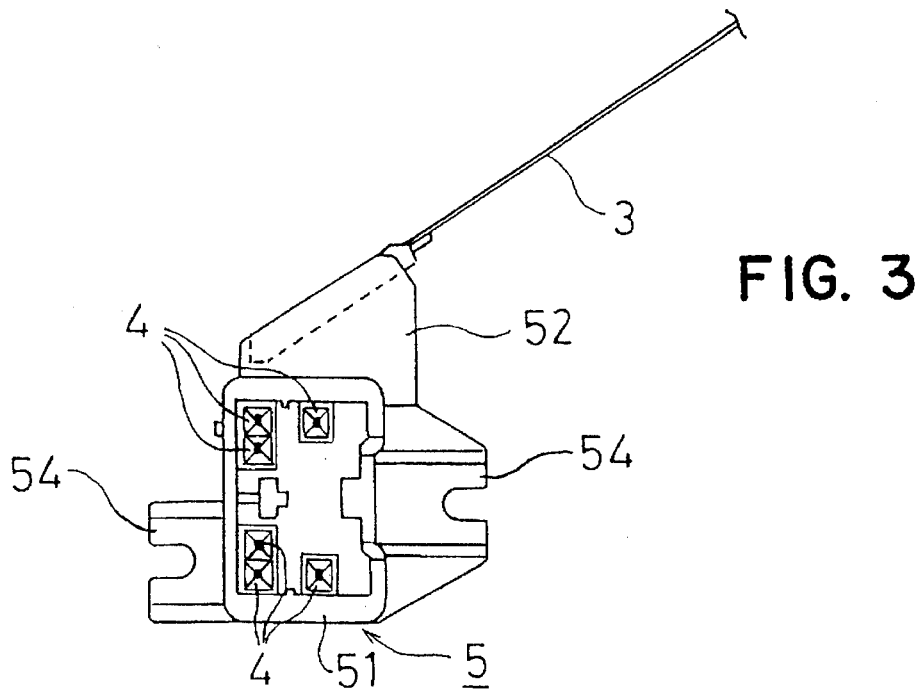
FIG. 3 is a top view taken in the direction D in FIG. 1.

FIGS. 1 to 6 show a preferred embodiment of the present invention.

In FIGS. 1 to 6, numerals 1 and 2 denote housings; 3, a flexible cable; 4, terminals; and 5, a supporting member. Housings 1 and 2 are fixed to such as a combination switch of automobiles, as a stator housing. The housings 1 and 2 rotatably support a rotor housing (not shown) connected to a steering wheel (not shown). The housing 1 is formed in a frame-shape, in contrast with the housing 2 is formed in a cover-shape and is combined with the housing 1.

The flexible cable 3 is a so-called flat cable having such structure that a plurality of conductive wires 31 is molded within a resin film. The flexible cable 3 is received within a space with a doughnut-shape produced by the housings 1 and 2 and the rotor housing, and the one end thereof is fixed on the housings 1 and 2 by the supporting member 5 and the other end thereof is fixed on the rotor housing.

The terminals 4 are made of metallic material such as copper, and formed by cutting connection pieces (not shown) connecting plural terminals molded in the supporting member 5. The one end of the terminal 4 is exposed within a connector section 51 of the supporting member 5, and the other end of the terminal 4 is exposed in a cable connecting section 52.

The supporting member 5 for mounting the terminals 4 with resin mold is composed of a connector section 51, the cable connecting section 52, a gap 53, and a fixing piece 54. The cable connecting section 52 is coupled on the connector section 51 of the supporting member 5 as a cantilever thereby forming a predetermined gap 53 between the connector section 51 and the cable connecting section 52.

Figure 4:
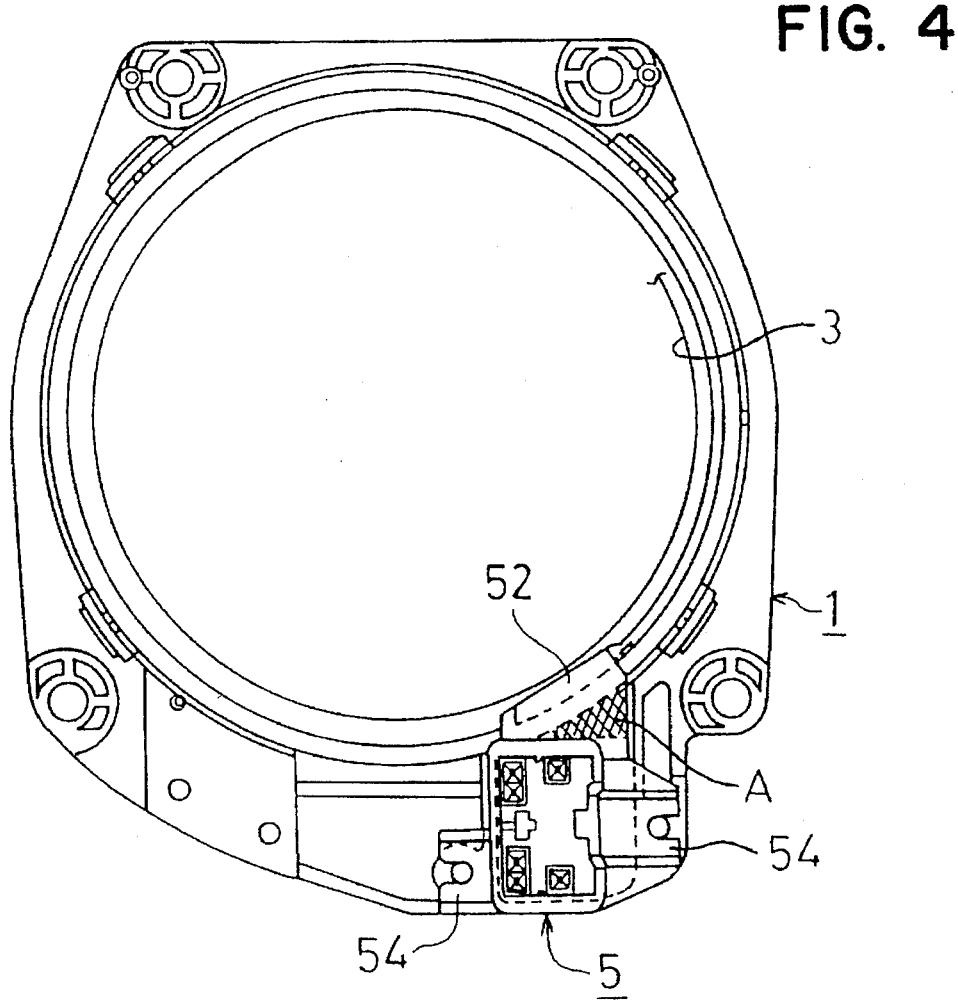
FIG. 4 is a top view showing one housing to be fixed with the supporting member.
Figure 5:
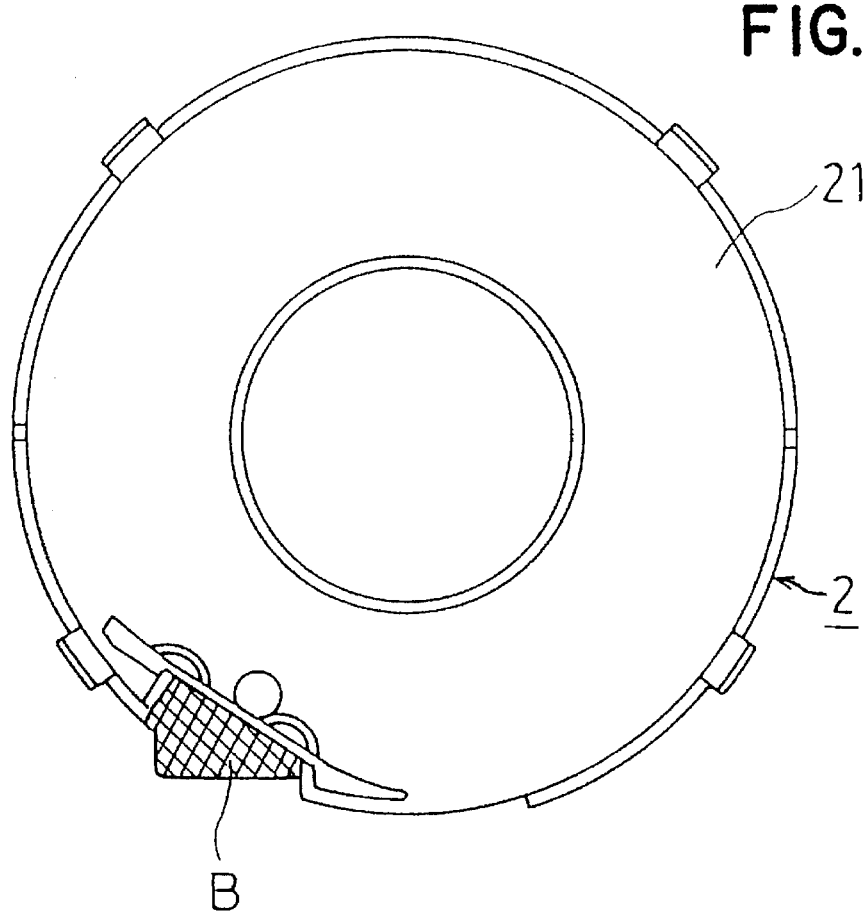
FIG. 5 is a top view showing the other housing to be fixed with the supporting member.
Figure 6:
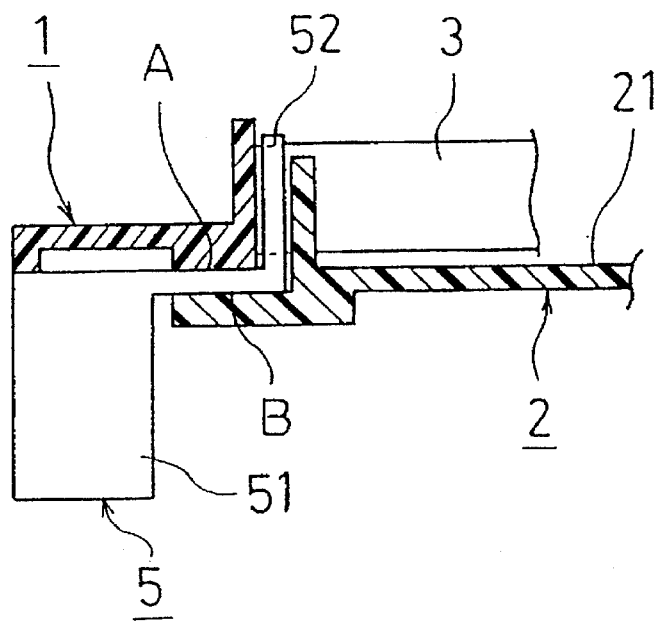
FIG. 6 is a schematic sectional view showing the state in which the supporting member is held by one housing and the other housing.
Figure 7:
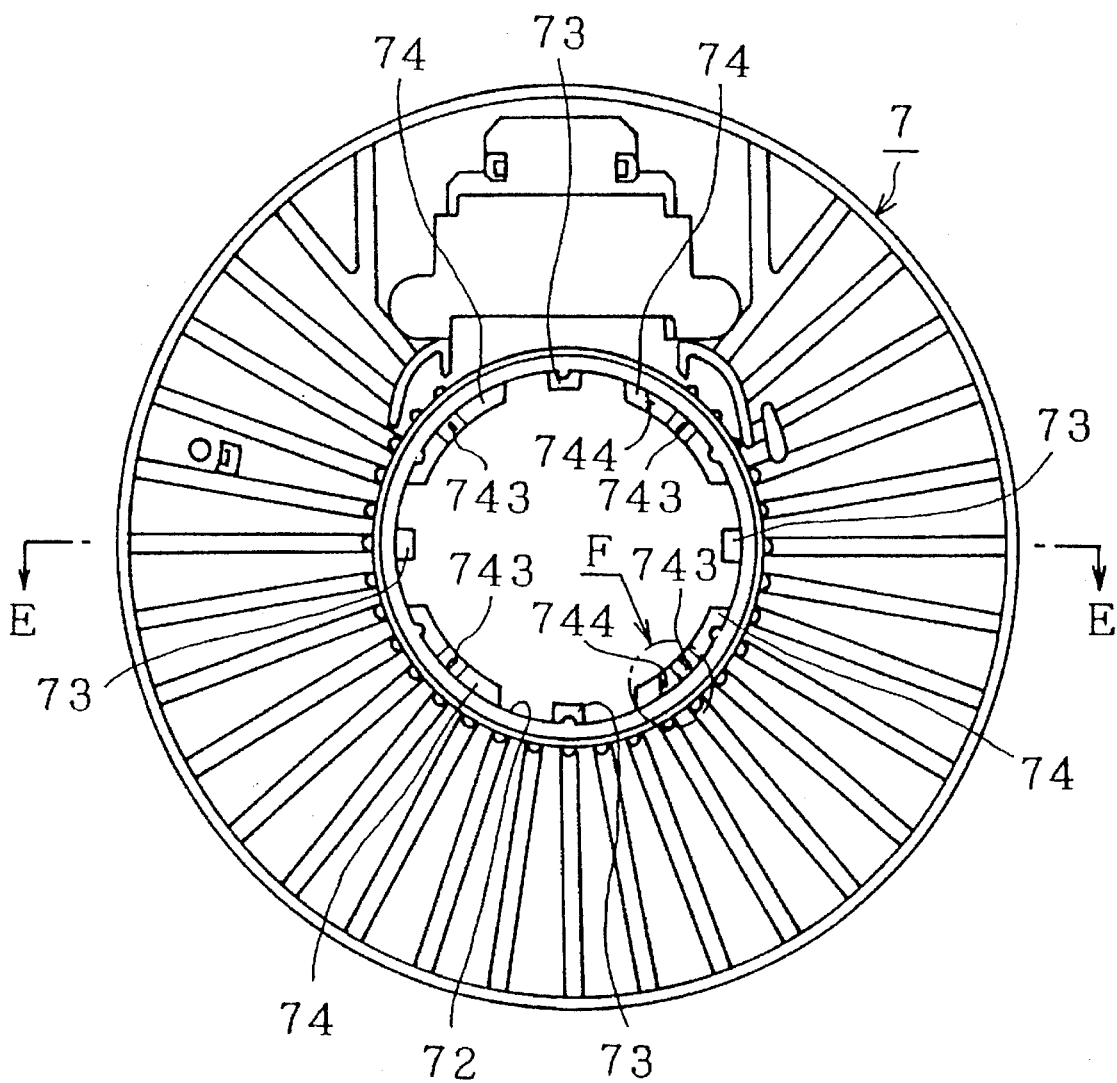
FIG. 7 is a front view showing a preferred embodiment of the present invention.
Figure 8:
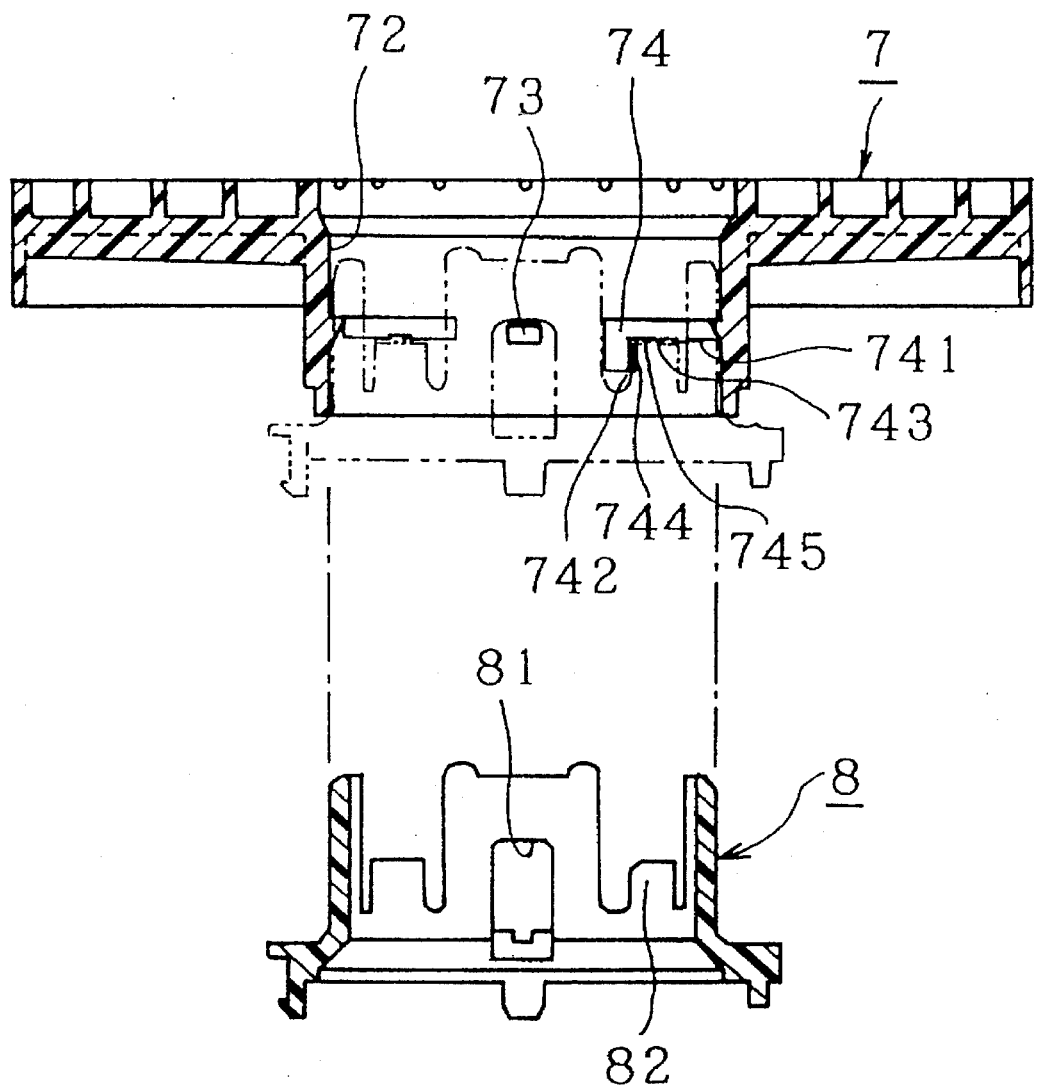
FIG. 8 is a sectional view taken along the line E—E in FIG. 7.

Moreover, there is provided a holder piece 55 on the cable connecting section 52 of the supporting member 5, and the holder piece 55 is fixed by both housings 1 and 2 at the cross-hatched portions A and B as shown in FIGS. 4 and 5, thereby holding the cable connecting section 52 by both housings 1 and 2. The cable connecting section 52 is thus held by both housings 1 and 2, and therefore it is possible to maintain the preferable condition that the flexible cable 3 is in parallel with the wall surface 21 of the housing 2, even though the supporting member 5 is deformed during molding process, as shown in FIG. 6.

Moreover, when the lower surface 56 of the connector section 51 is fixed on the housing 1 by using screws to fasten a fixing piece 54, any distortion generated between the connector section 51 and the cable connecting section 52 is absorbed by the gap 53. Furthermore, it is possible by utilizing the gap 53 to comparatively equalize the thickness of each of parts composing the supporting member 5, thereby restricting the generation of any deformation which may be generated during molding process of the parts composing the supporting member 5.

Referring now the operation of the rotary connector device thus structured, the rotary connector device is connected with for example an air bag device (not shown) mounted on a steering wheel side and an air bag controller (not shown) mounted on a vehicle side. At that time, the connector section 51 of the supporting member 5 is connected with a connector (not shown) mounted on the vehicle side. By this connection, it is possible that when automobile has encountered with, for example, any collision accident, the electric signal from the air bag controller is transmitted to, for example, an air bag device of a steering wheel pad through the flexible cable 3 of the rotary connector device, thereby igniting an inflator of the air bag and then inflate the air bag.

Referring now to FIGS. 7 to 11, a second embodiment of the present invention will be described hereinafter.

In FIGS. 7 to 11, numeral 6 denotes a stator housing; 7, a rotor housing; 8, an attachment; 9, a flexible cable; and 10 and 11, terminals.

The starter housing 6 is fixed on, for example, a combination switch (not shown) of an automobile. The rotor housing 7 is rotatably mounted with respect to the starter housing 6 and connected to a steering wheel (not shown) by using a connection pin 71. The rotor housing 7 is provided with claws 73 on an inner surface 72 and offsets 74. The claws 73 are provided for the purpose of fitting to mating part 81 mounted on the attachment 8, and the offsets 74 is provided for the purpose of contacting the projection 82 mounted on the attachment 8.

Figure 9:
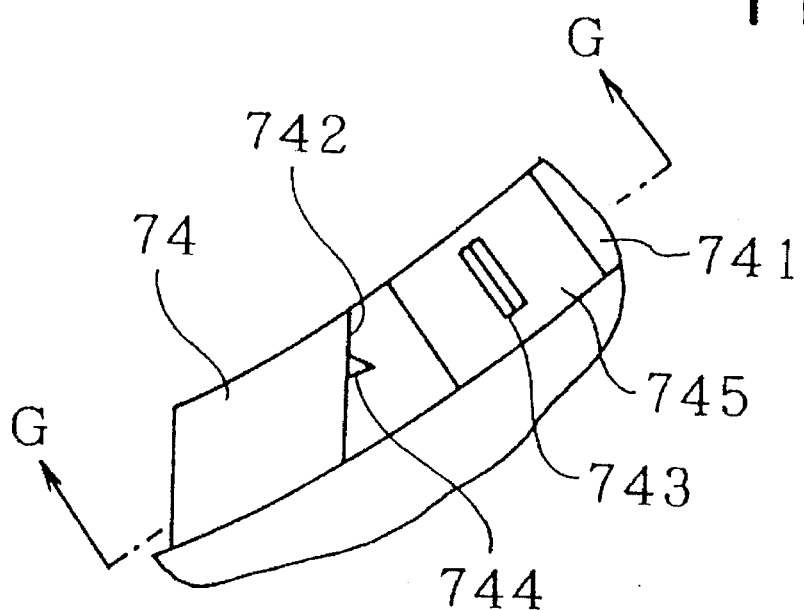
FIG. 9 is an enlarged view of the circled portion by the small circle F in FIG. 7.
Figure 10:
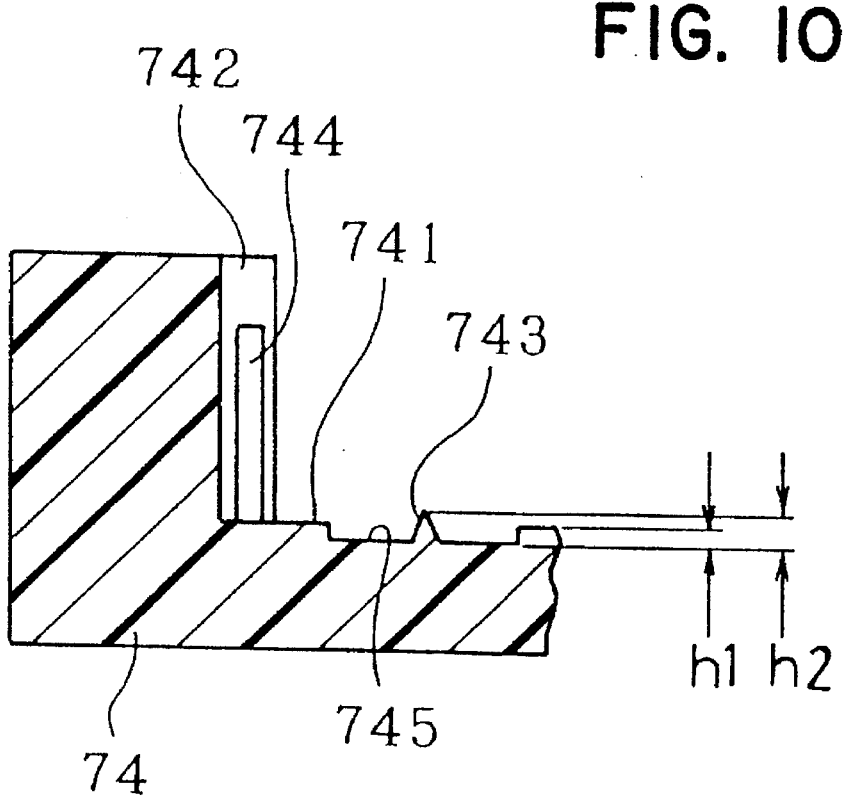
FIG. 10 is a sectional view taken along the line G—G in FIG. 9.
Figure 11:
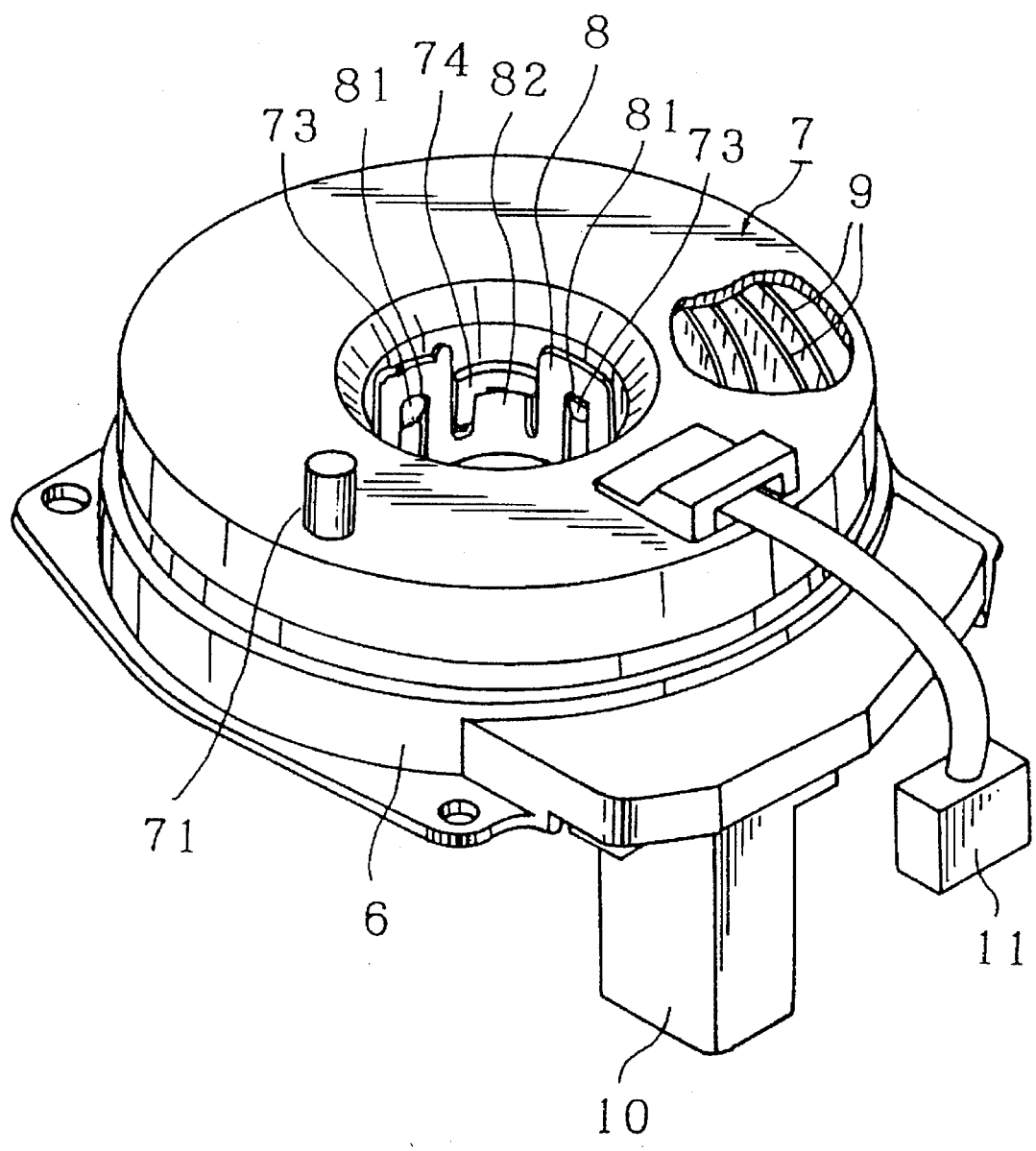
FIG. 11 is a perspective view showing a rotary connecting device as an embodiment of the present invention.

The detail structure of the offset 74 will be described with reference to FIGS. 9 and 10 hereinafter.

The offset 74 is provided with a first surface 741 in the circular direction of the rotor housing 7 and a second surface 742 in the axial direction. There are formed a first projection 743 at the first surface 741 and a second projection 744 at the second surface 742. Furthermore, there are provided a recess portion 745 at the first surface 741 and the first projection 743 at the approximately central portion of the recess portion 745.

The dimension h2 in height of the first projection 743 is set so as to be slightly larger than the depth h1 of the recess portion 745, for example h2−h1≈0.2−0.3 mm. By this structure, when the projection 82 of the attachment 8 contacts to the first surface 741, the projection 82 of the attachment 8 crushes the first projection 743 thereby absorbing the assemblage tolerance in an axial direction and eliminating the generation of clearance produced when the attachment 8 and the rotor housing 7 are assembled. Similarly, the projection 82 of the attachment 8 crushes the second projection 744 on the second surface 742 thereby absorbing the assemblage tolerance in circular direction and eliminating the generation of clearance.

The attachment 8 is used for connecting the housing 6 with the housing 7, and has the mating part 81 for resiliently fitting with the claw 73 of the rotor housing 7 and the projection 82 to be contacted to the offset 74 of the rotor housing 7.

The flexible cable 9 is so-called flat cable having such structure that conductive wires are molded with resin film. The flexible cable 9 is received within a doughnut-shaped space formed by the stator housing 6 and the rotor housing 7, and one end of the flexible cable 9 is electrically connected to the terminal 10 of the stator housing 6 and the other end thereof is electrically connected to the terminal 11 of the rotor housing 7 respectively.

Referring now to the operation of the rotary connector device thus constructed will be described hereinafter. In the rotary connector device, the terminal 11 is connected with for example an air bag device (not shown) mounted on a steering wheel side, and in turn the terminal 10 is connected with for example an air bag controller (not shown) mounted on a vehicle side. By this connection, it is possible that when automobile has encountered with, for example, any collision accident, the electric signal from the air bag controller is transmitted to, for example, an air bag device of a steering wheel pad through the flexible cable 9 of the rotary connector device, thereby igniting an inflator of the air bag and inflate the air bag.

The present invention should not be limited to the above mentioned embodiments. In the above-mentioned embodiments, the projection is mounted on the offset formed in the inner periphery of the rotor housing, however the projection may be mounted on the rotor housing or the attachment. Furthermore, the formation of the projection is not limited to a triangle column in section, and it may be the formation which might be easily crushed such as a cone column in section.

The advantages of the present invention are as follows.

The deformation of the supporting member undesirably generated during a molding process is small, and even though the supporting member is deformed, the preferable condition that the flexible cable is disposed in parallel with the wall surface of the housing can be maintained. Therefore the noise due to the sliding movement of the flexible cable may be reduced, and further the deterioration of the flexible cable in durability may be reduced.

Since the rotary connector device of the present invention is constructed such that there is provided a projection to be crushed upon assembling the stator housing, the rotor housing, and the attachment, on at least one of a stator housing, a rotor housing, and an attachment, it can be achieved that an assemblage tolerance is absorbed thereby preventing the generation of clearance, and further any noise may be produced during the rotation of the rotor housing with respect to the stator housing thereby not providing any discomfort feeling to passengers of vehicles.

Moreover, by providing a protection within a recess portion, it is achieved to possibly prevent the protection from being maintained within the recess portion thereby more effectively achieving the absorption of the assemblage tolerance.

Furthermore, sine such construction that there is provided an offset to be contacted with an attachment on at least one of a stator housing or a rotor housing, and further the offset provides a first surface having a first projection in the circular direction of the housing and a second surface having a second projection in the axial direction respectively, it is achieved to absorb the assemblage tolerance in both of circular and axial directions simultaneously.

What is claimed is:

1. A rotary connector device, comprising:
   housings;
   a flexible cable received in a space formed between said housings;
   a terminal electrically connected to conductive wires exposed from said flexible cable;
   a supporting member fixed on said housings and molded with said terminal;
   wherein said supporting member is provided with a connector section, and a cable connecting section connected to said connector section as a cantilever; and
   wherein said connector section of said supporting member is coupled with said cable connecting section with a predetermined gap.

2. A rotary connector device according to claim 1, wherein said cable connecting section of said supporting member is fixed at least on said housings.

3. A rotary connector device according to claim 1, wherein said housings comprise a stator housing and a rotor housing rotatably mounted with respect to said stator housing, and further comprising an attachment for coupling both housings, wherein projections to be crushed when said stator housing, said rotor housing, and said attachment are assembled, are mounted on at least one of said stator housing, said rotor housing, and said attachment.

4. A rotary connector device according to claim 3, wherein said projection is mounted within a recess section.

5. A rotary connector device according to claim 3 or 4, wherein an offset to be contacted to said attachment is formed on at least one of said stator housing and said rotor housing.

6. A rotary connector device according to claim 5, wherein said offset provides a first surface formed with a first projection in a circular direction of said housings, and a second surface formed with a second projection in an axial direction of said housings, respectively.

7. A rotary connector device, comprising:
   a stator housing;
   a rotor housing rotatably mounted with respect to said stator housing;
   an attachment for coupling both housings; and
   a flexible cable spirally received within a space provided between said stator housing and said rotor housing;
   a terminal electrically connected to conductive wires exposed from said flexible cable;
   a supporting member fixed on said housings and molded with said terminal;
   wherein projections to be crushed when said stator housing, said rotor housing, and said attachment are assembled are mounted on at least one of said stator housing, said rotor housing, and said attachment;
   wherein said supporting member is provided with a connector section, and a cable connecting section connected to said connector section as a cantilever; and
   wherein said connector section of said supporting member is coupled with said cable connecting section with a predetermined gap.

8. A rotary connector device according to claim 7, wherein said cable connecting section of said supporting member is fixed at least on said housings, and wherein said projection is mounted within a recess section.

9. A rotary connector device according to claim 7, wherein an offset to be contacted to said attachment is formed on at least one of said stator housing and said rotor housing.

10. A rotary connector device according to claim 9, wherein said offset provides a first surface formed with a first projection in a circular direction of said housings, and a second surface formed with a second projection in an axial direction of said housings, respectively.

* * * * *